United States Patent Office 2,720,451
Patented Oct. 11, 1955

2,720,451
CONTROL OF SUCKERS IN TOBACCO PLANTS

Donald B. Anderson and Robert W. Wilson, Raleigh, N. C., assignors to Patent and Development, Inc., Raleigh, N. C., a corporation of North Carolina No Drawing. Application October 31, 1952,
Serial No. 318,104

5 Claims. (Cl. 71—2.1)

This invention relates to tobacco growth regulators and more particularly to a method of controlling suckers in tobacco plants comprising the application to the external surface of the stem at the top of the tobacco stalk of a substance that will distribute itself to the sucker-producing areas and thereby arrest sucker growth.

Tobacco plants are started in seed beds and later transplanted into rows. As the plants mature, they tend to propagate themselves by producing flowers at the top of the plant. The growth of the seed causes a reduction in quality of the tobacco. In order to obtain larger and heavier leaves which, after all, are the portions marketed, the flowers are broken off in an operation referred to as "topping." However, removal of the top upsets the hormone balance of the plant, which promotes the growth in the axils or nodes of the tobacco plant, of lateral buds commonly referred to as "suckers."

In order to reap the advantages of topping these suckers must be removed. As is well known among tobacco farmers, this problem of sucker control is one of the most expensive and disagreeable phases of tobacco culture. The suckers appear in the leaf axils of the tobacco plant when it has reached a somewhat mature stage, and if permitted to grow they will prevent the desired full growth of the tobacco leaves, thus reducing the quality and quantity of the tobacco produced.

Heretofore, the only known methods have been either to remove these suckers from the leaf axils by the tedious procedure of breaking them off manually or to apply a sucker-controlling substance to each separate leaf axil or sucker bud therein. It can be appreciated that both are time-consuming and expensive processes. In addition, manual suckering is such a disagreeable sticky job that it is difficult in some areas to get workmen to do it. As a matter of fact, topping and suckering occur at harvest time which requires considerable labor, thus the farmer, under previous circumstances, often had to save on labor by totally eliminating the topping and suckering operations. The disadvantages resulting from this latter practice are obvious.

A constant effort has been maintained to discover a new means and method for tobacco sucker control in order to overcome the disadvantages listed heretofore. Research attempts have been primarily aimed at the attainment of a novel way to apply chemicals to tobacco stalks so as to combine the topping operation with the sucker-control phase. Such an attainment would produce advantages that would significantly reflect on the economical aspects of tobacco production. For example, a large number of tobacco plants could be treated in a far shorter time than was previously possible thus cutting down man-hour requirements in the field. Further, the chemical control of this sucker growth would be on a more refined basis and, actually, sucker growth would be prevented. This latter fact should be compared to previous practice where some sucker growth had to occur, of necessity, before the actual hand-breaking operation could commence.

The primary object of the present invention is to provide a new method for preventing or minimizing the growth of suckers in tobacco plants.

Another object is to provide a new method for controlling sucker growth in tobacco plants which involves the use of sucker-controlling chemicals applied at the top of a tobacco stalk.

A more specific object of the invention is the provision of a method for controlling sucker growth in tobacco plants which combines the tobacco-topping operation with the sucker control phase by applying a sucker-controlling substance to the surface of the stem at the newly topped end of a tobacco stalk so that the said sucker-controlling substance will distribute itself to the sucker-producing areas.

A further object of our invention is to provide a process for controlling sucker growth in tobacco plants which comprises applying a small amount of a sucker-controlling substance to the top of a tobacco stalk so that the said substance will run down the stalk and film or coat the leaf axils or the sucker buds therein and stunt or kill the buds sometimes as soon as ten minutes after treatment.

Another and further object of our invention is to provide novel sucker-controlling substances such as petroleum oil and vegetable oil to be used in our novel method for controlling sucker growth in tobacco plants.

Still further objects and the entire scope of applicability of the present invention will become apparent from the detailed description given hereinafter. It should be understood, however, that the detailed description, while indicating preferred embodiments of the invention, is given by way of illustration only, since various changes and modifications within the spirit and scope of the invention will become apparent to those skilled in the art from this detailed description.

Our novel process is designed to bring about substantially complete arrest of sucker growth. We have found that certain chemicals, when applied to the topped portion of a tobacco plant, will run down the stalk and film or coat the leaf axils or the sucker buds therein. The buds so treated will die or become stunted within twenty-four to forty-eight hours.

It should be noted that complete application is made possible by the fact that tobacco leaves are spirally spaced about the stalk of the plant. It can thus be seen that some of the film will come into contact with each of the leaf axils, i. e., since no one leaf is positioned directly above another, free access of the sucker-controlling film to each axil is insured.

The significant advantages afforded by our novel method for applying such sucker-controlling chemicals is best appreciated by bearing in mind that previous practice for sucker control had been primarily confined to topping the tobacco by hand and then pulling or cutting the suckers when they developed appreciable size.

Our novel method basically involves the application of a sucker-controlling compound to the surface of the top portion of the tobacco stem coincidentally with or shortly after the topping of the same. The oil may be applied with various types of mechanical equipment. A typical practical means for applying such a sucker-controlling substance is by the use of a pressure spray tank carried on the operator's back and connected by a flexible hose to an applicator which distributes the oil uniformly at the surface of the stem at the top of the stalk. The nozzle or applicator at the end of the hose may be provided with jet openings to distribute the oil around the upper surface of the stem. The applicator may be so designed as to fit over the top of the stalk and may be provided with a sponge, brush material or a catch to prevent excess oil from dripping on to the leaves of the plant and to provide for more uniform distribution of oil on the stalk. It can readily be appreciated that this coincidental application of a sucker-controlling substance at the time of the topping of the tobacco plant brings about a significantly great saving in labor requirements for complete tobacco topping and sucker control. The fact that no hand suckering is required and, further, that application of sucker control composition to each individual leaf axil is unnecessary, is significantly reflected in dollars and man-hours saved.

The above discussed novel method of applying the sucker-controlling substance is of primary significance and has been found to be practicable when used with any sucker-controlling chemical as long as the latter does not possess properties that would tend to injure the tissues of the stem or leaves of the tobacco plant. Many oils have been found useful in our method for controlling suckers, as illustrated by the following representative list. We have found lubrication oils, used crank case oil, greases, cottonseed oil, peanut oil, castor oil, fish oil and medicinal mineral oil to give operative results. However, medicinal white mineral oil in an emulsified form, for example, a 50—50 emulsion of water and oil, gives preferred results.

An indication as to the manner in which the above listed compounds function or accomplish the desired results when utilized in our novel method is hereinafter summarized. Briefly, oil, when applied to a surface, tends to spread out and leave a coating on the surface. In the present development, the oil emulsion covers the plant tissues with a thin film that exerts sucker-control action. It should be noted, that when an oil is used on a tobacco plant it attacks the young tissues very rapidly while the older tissues are less affected. A low viscosity oil tends to be more effective in killing than would an oil of a higher viscosity. However, it is important to use a viscosity such that the most sucker kill is achieved with the least plant damage. In this manner, the new sucker growth can be killed without adversely affecting the older leaf tissue. Therefore, oil of a very low viscosity is not utilized even though it would be a more effective killing agent. The danger would be too great that such an oil would also damage the older leaf tissue. Accordingly, a higher viscosity oil is preferred which will exert adequate sucker control and yet not be powerful enough to adversely affect the valuable mature leaf tissue.

The physical characteristics of the compounds utilized to bring about the desired results when our novel method of application is relied upon for sucker-growth control are also of significant interest. The characteristic which most nearly differentiates oils which will and will not control sucker growth is, understandably, the viscosity of the oil. For example, oils of a viscosity of less than 100 Saybolt Universal seconds give more penetration and cell killing power than oils with viscosity above 100. As a matter of fact, such low viscosity oils could, under certain circumstances, kill the whole tobacco plant. Thus, it is generally necessary to utilize oils of a viscosity of greater than 100 Saybolt Universal seconds. Other characteristics which have an effect on the oils to be used are (1) a good filming characteristic and (2) the facility to form an oil-water emulsion that will be stable for at least the period required for the operation.

It should be understood that a small amount of sucker-controlling substance is sufficient to carry out our novel method. This amount is, of course, indefinite in view of the fact that tobacco plants vary in size. An amount should be applied sufficient to insure a substantially complete filming of the particular tobacco stalk being treated. Ordinarily, a small amount of about 1 to 5 ml. of the oil emulsion per plant has been found to give satisfactory results.

In addition, it should be stressed that this invention is not limited to the use of the disclosed oils since it is contemplated that other compositions can be used effectively for sucker control in field-grown tobacco plants in accordance with the broad principles of our discovery. Also, other materials may be used in conjunction with the sucker-controlling substance for specific effects. For example, a suitably small amount of an antibiotic such as sulfanilamide may be added to protect the tobacco plant from invasion of bacteria or fungi in the buds. The addition of these chemicals in a sucker-controlling substance in quantities which will not harm the tissues of the tobacco plant are to be considered a part of the present invention.

*Conclusions*

By our novel process we have succeeded in accomplishing significant advances in the production of tobacco. By applying a sucker-controlling substance to the upper portion of a tobacco stalk at the time the same is being topped so that the entire tobacco stem derives results therefrom, we have succeeded in reducing the cost and labor previously associated with the problem of sucker control. In addition, we enhance the quality and quantity of the tobacco leaf ultimately obtained because our novel method of sucker control operates in the very early stages of the sucker growth period prior to the time that any significant sucker growth occurs. As a result of this process we can utilize the sucker-controlling substances disclosed, as well as others that are known to the trade, to substantially obviate the problems that have heretofore been prevalent in tobacco culture.

Of course, it should be understood that other crops may be similarly treated especially if their leaves are spaced in like manner to the tobacco plant, i. e., spirally around the stalk. In other words, the present invention is not limited to tobacco plant culture but can be used effectively in the production of any crops where similar problems arise that can be solved in accordance with the broad principles of our discovery.

The novel principles of this invention are broader than the specific embodiments recited above and rather than unduly extend this disclosure by attempting to list all of the numerous modifications which have been conceived and reduced to practice during the course of this development, these novel features are defined in the following claims.

We claim:

1. A method of preventing the growth of suckers in a tobacco plant comprising applying at about the time of topping and before any substantial sucker growth occurs, a sucker-controlling oily liquid composition to the top portion of the stalk of the said tobacco plant, said composition being applied in an amount sufficient to substantially completely coat the sucker-producing areas of the stalk, permitting the said composition to run down the said stalk and coat the leaf axils wherein the sucker buds are formed, thereby arresting the growth of the said sucker buds.

2. The method of claim 1 wherein the sucker-controlling composition is mineral oil.

3. The method as claimed in claim 1 wherein the sucker-controlling composition utilized is of a viscosity of greater than 100 Saybolt Universal seconds.

4. The method as claimed in claim 1 wherein the sucker-controlling composition utilized comprises from 1 to 5 ml. of medicinal mineral oil.

5. A method of preventing the growth of suckers in a tobacco plant comprising topping the said plant and immediately thereafter applying a sucker-controlling oily liquid composition to the top portion of the stalk of the said tobacco plant, said composition being applied in an amount sufficient to substantially completely coat the sucker-producing areas of the stalk, permitting the said composition to run down the said stalk and coat the leaf axils wherein the sucker buds are formed, thereby arresting the growth of the said sucker buds.

(References on following page)

References Cited in the file of this patent

UNITED STATES PATENTS

| | | |
|---|---|---|
| 534,095 | Cole et al. | Feb. 12, 1895 |
| 2,098,135 | Daughety | Nov. 2, 1937 |

OTHER REFERENCES

Science, vol. 105 (Apr. 25, 1947), pages 435 and 436.

Plant Physiology, vol. 25 (Jan. 1950), pages 103–113.

Anderson and Hardesty, "Research and Farming," N. Car. Ag. Exp. Sta., 8:19 (July 1949).

"The Clip-Oil," Dept. Agr. Engineering, N. Car. Ag. Exp. Sta., Information Series No. 3; Oct. 1950 (16 pages).